(12) United States Patent
Jones, Jr. et al.

(10) Patent No.: US 6,460,656 B1
(45) Date of Patent: Oct. 8, 2002

(54) DILATING LUBRICANT FLINGER

(75) Inventors: William B. Jones, Jr., Hacienda Heights; Khajak Jack Minassian, Glendale, both of CA (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/536,511

(22) Filed: Mar. 27, 2000

(51) Int. Cl.[7] .............................. F01M 9/06; F16N 7/26
(52) U.S. Cl. ...................... 184/13.1; 184/11.1; 384/472
(58) Field of Search .............................. 184/11.1–11.5, 184/13.1; 384/472

(56) References Cited

U.S. PATENT DOCUMENTS

| | | | | |
|---|---|---|---|---|
| 1,687,395 A | * | 10/1928 | Shew | 184/13.1 |
| 2,335,557 A | * | 11/1943 | Winther | 384/472 |
| 2,439,709 A | * | 4/1948 | Asbury | 384/472 |
| 2,950,943 A | * | 8/1960 | Forrest | 184/13.1 |
| 4,466,508 A | | 8/1984 | Buse | 184/13.1 |
| 4,591,024 A | | 5/1986 | Erickson | 184/11.2 |
| 5,328,275 A | * | 7/1994 | Winn et al. | 384/472 |
| 5,499,902 A | * | 3/1996 | Rockwood | 184/11.2 |
| 5,647,735 A | * | 7/1997 | Rockwood | 184/11.2 |
| 5,779,005 A | * | 7/1998 | Jones, Jr. et al. | 384/472 |
| 5,826,986 A | * | 10/1998 | Adkins et al. | 384/472 |

FOREIGN PATENT DOCUMENTS

| | | | | |
|---|---|---|---|---|
| DE | 37325 | * | 3/1968 | 184/13.1 |
| GB | 121092 | * | 12/1918 | 184/13.1 |

* cited by examiner

*Primary Examiner*—Chong H. Kim
(74) *Attorney, Agent, or Firm*—Killworth, Gottman, Hagan Schaeff, L.L.P.

(57) ABSTRACT

A lubricant flinger, for providing lubricant fluid to bearings on a horizontal shaft within a wet-sump bearing housing, has a rotationally balanced body with portions extending radially sufficiently to reach below a lubricant level in the wet-sump. The body has provisions for fixing it on the horizontal shaft and is capable of insertion, while mounted on the horizontal shaft, into the housing through a bearing bore of radius smaller than that of the body. Outer portions of the body may have features which enhance lubricant pick-up.

4 Claims, 3 Drawing Sheets

DILATING LUBRICANT FLINGER

BACKGROUND OF THE INVENTION

This invention relates generally to rotating machines having a wet sump bearing-housing and more particularly to a lubrication system for the bearings supporting-horizontal shafts of such rotating machines.

Machines with non-pressurized lubrication systems are commonly made with splash lubrication provisions, for example oil scoops of the type often supplied on bearing caps on horizontal crankshafts of reciprocating engines. A lubrication system is needed because it is necessary to keep the lubricant level low enough to avoid flooding the bearings and seals surrounding the crankshaft. Such crankshafts have main bearing journals and eccentric rod bearing journals with counterweights to balance the off-center rod bearing journals. The crankshafts are installed by setting them in place on the split main bearing saddles and fastening mating bearing caps over them. Connecting rods are rotatably connected to the eccentric crankshaft throws using rod bearing journal saddles and caps similar to those of the main bearings. When the crankshaft is rotated, the throws alternately dip into an oil sump in an oil pan, which surrounds the crankshaft, and throw oil about the inside of the engine to lubricate the moving parts.

In non-reciprocating machines, there are three ways of lubricating, namely 1) throwers which dip into a lubricant sump to splash lubricate the machine; 2) lubricant slingers which are mounted on the shafts to provide splash lubrication from low-level wet sumps; and 3) flooded lubrication, shown in FIG. 1, where bearings 20 and seals 21 are partially immersed in a lubricant bath and lubrication occurs by bearing ball or roller rotation. This bearing motion intensifies lubricant shear which raises its temperature, reduces its viscosity, and reduces its lubricating efficiency. To avoid these limitations of flooded sump lubrication systems, attempts have been made to reduce lubricant level by using devices which extend radially from the shaft to dip into the lubricant sump. For example, oiling rings which hang eccentrically from the horizontal shaft, as seen in FIG. 3, are used to dip into low level wet sumps to throw lubricant about in the machine. However, they must be driven through slippage by the shaft at a reduced speed. Many factors influence the operating speed of the oiling ring, such as oiling ring weight, lubricant viscosity, buoyancy force, and depth of oiling ring immersion in the lubricant sump. Any significant variation in any of these parameters may tend to limit the lubricating capabilities and stability of the oiling ring. Furthermore, oiling ring lubrication is not suitable for applications involving frequent starts and stops; because the rings tend to become unstable and bounce during starting and stopping. Lubricant discoloration occurs when material is removed from the ring and/or the shaft due to the relative slippage or bouncing of the oiling ring with respect to the shaft.

Another example of lubrication systems for non-reciprocating machines is the use of a solid disc flinger which is driven directly by the shaft and rotates at shaft speed without slippage. This device is illustrated in FIG. 2. Since the solid disk flinger has no eccentricity, it cannot provide lubrication from low-level wet sumps. The outside diameter of the solid disk must be smaller. than the housing bore; therefore, it requires a higher level wet sump which may partially submerge the bearings and flood seals 21 around the horizontal shaft during operation, thereby leading to lubricant leakage through the seals 21. The partially submerged bearings cause more lubricant shear which increases the lubricant sump temperature and reduces the effectiveness of the lubricant.

Housings of horizontal-axis non-reciprocating machines are often made with walls having bearing mounting holes bored through them rather than being axially split to permit radial separation of the housing and to thereby permit sideways installation of the shaft. Thus, shafts in those machines must be installed axially through bearing bores in the housings, and anything on the shafts which extends beyond the radius of the bores must be eliminated. This restriction severely limits splash lubrication capability in non-flooded machines, since shaft-mounted slingers that fit through the bearing bores cannot reach the lubricant in low-level wet sumps.

The foregoing illustrates limitations known to exist in present horizontal shaft machines which have one-piece housings. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a lubricant flinger for supplying lubricant fluid to bearings on a horizontal shaft within a wet-sump bearing housing, the flinger comprising a rotationally balanced body having portions extending radially. sufficiently to reach below a lubricant level in the wet-sump; means for fixing said body on said horizontal shaft; and means for permitting insertion of the body, mounted on the horizontal shaft, into the housing through a bearing bore of radius smaller than that of said body.

The foregoing and other aspects will become apparent from the following detailed description of the invention when considered in conjunction with the accompanying drawings.

DETAILED DESCRIPTION

Figure 1:
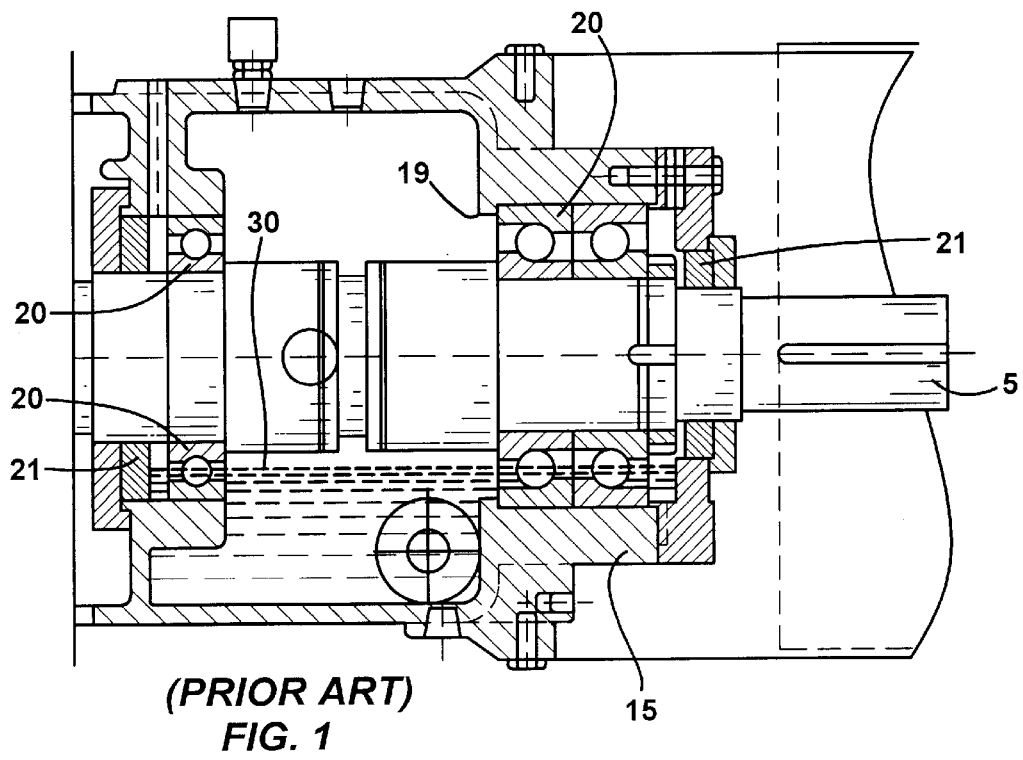
FIG. 1 is a schematic sectional elevation view of a horizontal machine of the prior art, with flooded bearing lubrication.
Figure 2:
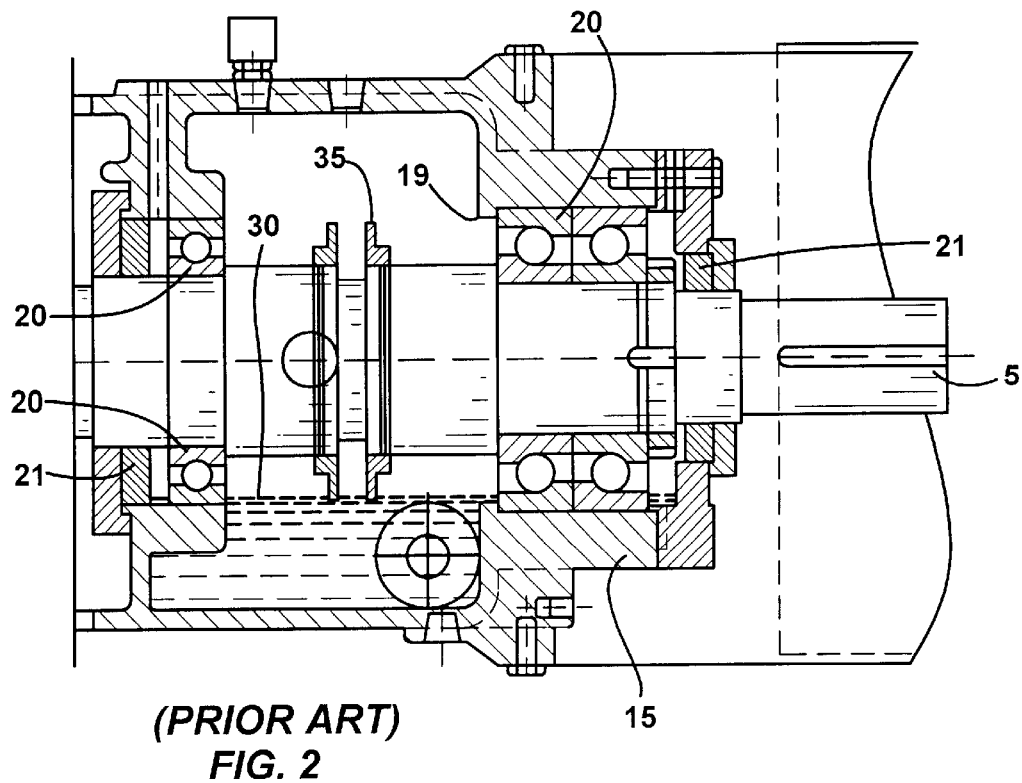
FIG. 2 is a schematic sectional elevation view of a horizontal machine of the prior art, with lubricant thrower lubrication.
Figure 3:
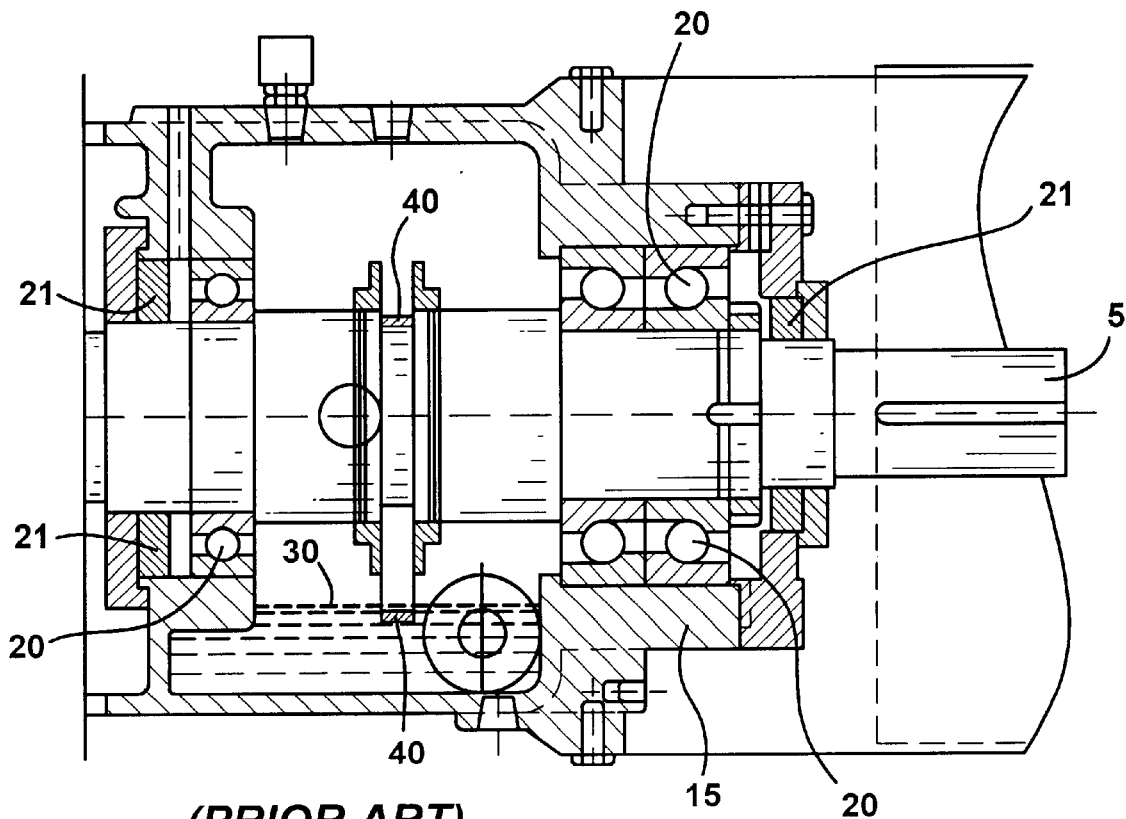
FIG. 3 is a schematic sectional elevation view of a horizontal machine of the prior art, with oiling ring lubrication.
Figure 7:
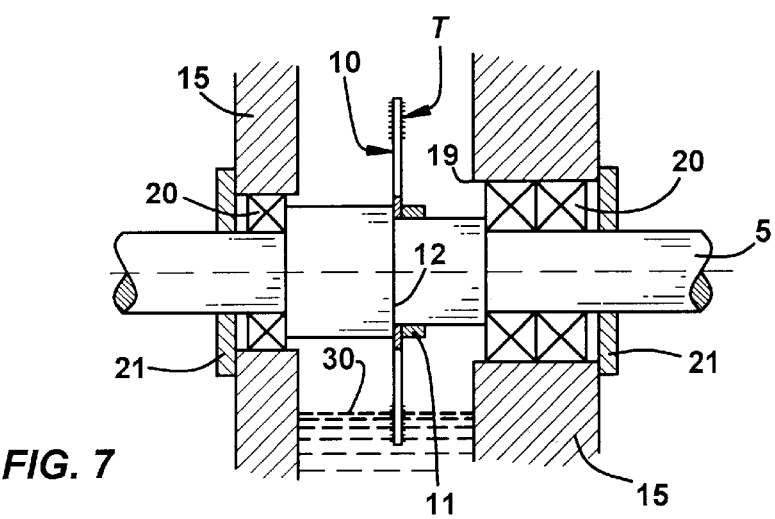
FIG. 7 is a schematic fragmentary transverse partially sectional view of a lubricant flinger according to the invention installed in a machine housing.
Figure 8:
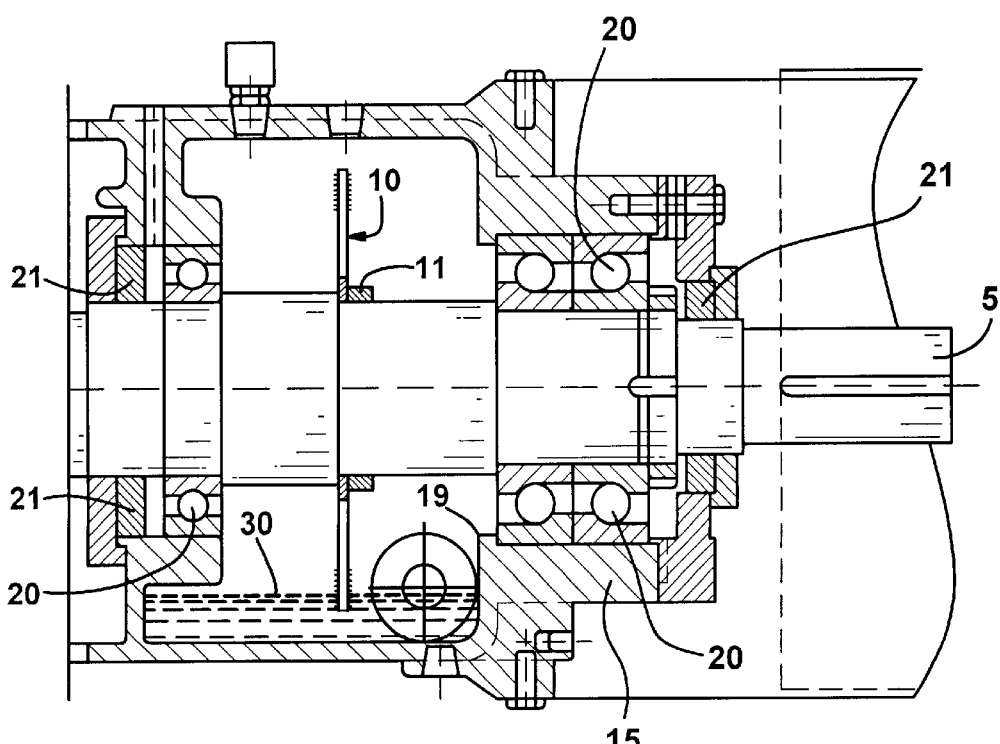
FIG. 8 is a schematic sectional elevation view of a horizontal machine with a dilating lubricant flinger according to the invention for direct comparison to the prior art lubrication systems of FIGS. 1, 2, and 3.

FIGS. 1 through 3 and 8 provide direct comparisons between three prior art lubrication systems, of FIGS. 1–3, for horizontal machines and the dilating lubricant flinger of the invention, shown in FIG. 8. In all cases, a horizontal wet-sump machine is illustrated. It has a housing 15 with bearing bores 19 through which the shaft 5 is inserted. The housing 15 is not split; therefore, anything mounted on the shaft 5 must pass through the bores 19. This limits the diameter of the shaft-mounted lubricant distribution device to not more than the diameter of the bores 19 and also requires the level of the lubricant 30 in the wet sump to be maintained at a near-flooded level. In FIG. 1, a flooded lubricant system is shown in which bearings 20 and seals 21 are partially submerged, and in which the lubricant is distributed by rotation of the bearings 20. The solid disk thrower 35, illustrated in FIG. 2, can operate with a slightly lower level of lubricant 30 in the sump because of the radial extent of the thrower, which is substantially the same as that of the bores 19 and the bearings fitted therein. The oiling ring 40, which is shown in FIG. 3, can operate with the lowest lubricant level of all the prior art lubrication systems. Of course, each of the lubricant distribution devices has, to varying degrees, the disadvantages discussed above when compared to the dilating lubricant flinger 10 of the invention shown in FIG. 8. The advantages of the lubricant flinger 10 over prior art devices are most clearly illustrated by referring to FIGS. 4–7.

Figure 4:
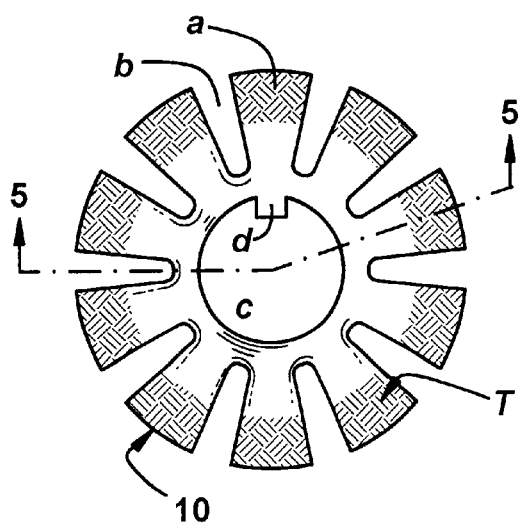
FIG. 4 is a schematic front view of a lubricant flinger of the invention in its relaxed state.
Figure 5:
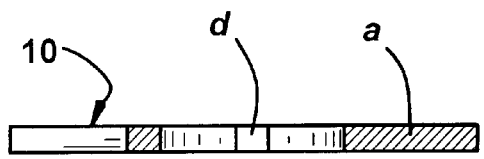
FIG. 5 is a schematic sectional side view of the lubricant flinger taken along line 5—5 of FIG. 4.

Looking first at FIGS. 4 and 5, the flinger 10 consists of a disk-like body 9 with a plurality of arms "a" separated by cutaway portions "b", a central opening "c" for fitting over a shaft 5, and at least one tab "d", or other means for radially and axially locking the flinger 10 to the shaft 5. The tab "d" is shown to illustrate only one simple means for accomplishing the required locking. The cutaway portions "b" extend from the outer edge of the body 9 to a circular locus near to and surrounding the central opening "c". The tab "d" is shown as it is only to illustrate a feature on the body 9 for engagement with a congruent feature on the shaft 5 to radially and axially fix the flinger 10 to the shaft. The retainer ring 11, seen in FIG. 7, may be used to hold the flinger body 10 in axial engagement with an interlocking feature on the shoulder 12 of the shaft 5 rather than the tab "d" being engaged in a slot of the shaft. The number of and the configuration of such features are a matter of design choice and manufacturing feasibility. Radially outer portions of the arms "a" may be provided with a texture "T", such as knurling, corrugation, or other texture form, in order to improve lubricant pick-up from the wet sump.

Figure 6:
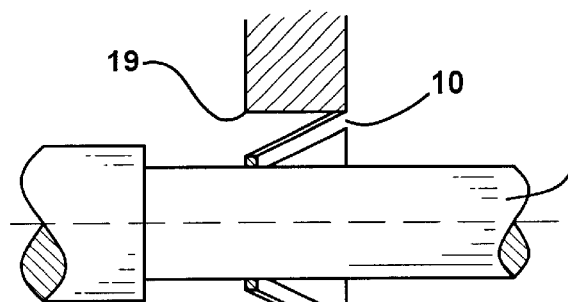
FIG. 6 is a schematic transverse fragmentary partially sectional view of a lubricant flinger illustrating compression of the flinger during installation into a machine housing through a bearing support bore.

The flinger 10 is made from thin hard stock, which is capable of a high degree of elastic deflection. The cutaway portions "b" are large enough and numerous enough to permit the arms "a" to readily flex in an axial direction, as shown in FIG. 6, and to pass into the housing 15 through bores 19 which are only slightly larger than the shaft 5 on which the flinger 10 is mounted. The bores 19 support bearings 20, in which the shaft 5 is mounted. After insertion, the flinger 10 dilates, or springs back, as seen in FIG. 7, so that its lower edge is submerged in the lubricant 30 in the sump of the housing 15. As can be readily seen, the level of lubricant 30 in the sump, which is below the bearings 20 and seals 21, is lower for the dilating flinger 10 of the invention than for any of the prior art devices, even the oiling ring 40. Moreover, the dilating flinger 10 does not cause the lubricant discoloring encountered with the oiling ring and is not subject to the instability and bouncing during starting and stopping of the machine. The radial extent of the textured portion "T" of the flinger surface is approximately the same as the depth of submergence of the dilating flinger 10 in the lubricant to optimize pick-up of the lubricant 30 by the flinger.

In operation, the shaft 5 rotates, and the flinger 10 rotates with it with no slippage. Depending upon its viscosity and wetting ability, a certain amount of the lubricant 30 is picked-up by the rotating flinger 10 and flung outwardly in the housing 15. It splashes or runs off the housing walls to lubricate the bearings 20 and other internal moving parts of the machine. Because of the flinger 10, it is possible to maintain the level of lubricant 30 well below the level of the bearing bores 19 and the seals 21. This simplifies sealing and prevents leakage of lubricant. Since the flinger 10 is fixed to the shaft 5, using the tab "d", or the retaining ring 11 and the shaft shoulder 12, and since it has no contact with any stationary part after installation, it does not contribute to lubricant overheating and discoloration, thereby conserving lubricant.

Having described the invention, what is claim is:

1. A lubricant flinger adapted for mounting on a horizontal shaft within a wet-sump bearing housing for providing lubricant to bearings supporting said shaft, said housing having a lubricant level below the lowest level of bearing bores in walls of said housing, the flinger comprising:

a rotationally balanced body having a radial extent sufficiently greater than said bearing bores to reach below said lubricant level in the wet-sump; and means for permitting insertion of the body through said bearing bores for mounting on the horizontal shaft, said means comprising a plurality of radial slots extending from the outer periphery of the body to a circular locus slightly smaller than said bearing bores, said body being made from thin hard material capable of being elastically folded to lie substantially parallel to said shaft during insertion through said bearing bores into said housing and springing back to lie substantially perpendicular to said shaft after complete insertion.

2. The lubricant flinger of claim 1, further comprising:

means for enhancing lubricant pick-up of the body during operation of said shaft.

3. The lubricant flinger of claim 1, wherein the means for fixing said body on said horizontal shaft comprises a retainer ring fixed to said shaft such that said retainer ring clamps said body against a shoulder on said shaft.

4. A lubricant flinger for providing lubricant fluid to bearings on a horizontal shaft within a wet-sump bearing housing having a lubricant level below the bottom edge of a bearing bore through which said shaft and flinger must be installed, said flinger comprising:

a substantially circular body adapted for mounting on said shaft and made from a thin hard material, said body having a radial extent sufficient to reach below the lubricant level in the wet-sump; and a plurality of radial cutaway portions extending from the outer edge of said circular body to a circular locus near the center of said body, said locus having a diameter less than that of a bearing bore through which said flinger is inserted into said housing, such that uncut portions, or arms, of said body can be elastically compressed along said shaft for insertion through said bearing bore.

* * * * *

UNITED STATES PATENT AND TRADEMARK OFFICE
CERTIFICATE OF CORRECTION

PATENT NO.   : 6,460,656 B1
DATED        : October 8, 2002
INVENTOR(S)  : William B. Jones, Jr. and Khajak Jack Minassian It is certified that error appears in the above-identified patent and that said Letters Patent is hereby corrected as shown below:

Column 1,
Line 6, "wet-sump bearing-housing" should be -- wet sump bearing housing --;
Line 7, "bearing supporting-horizontal" should be -- bearings supporting horizontal --;
Line 63, "must be smaller. than the" should be -- must be smaller than the --;

Column 2,
Line 30, "portions extending radially. sufficiently" should be -- portions extending radially sufficiently --;

Signed and Sealed this

Thirteenth Day of May, 2003

JAMES E. ROGAN
*Director of the United States Patent and Trademark Office*